May 26, 1970  H. L. HEARNS  3,513,501
FILM WIDTH CONTROLLER
Filed Sept. 7, 1967

INVENTOR.
Harold L. Hearns
BY
Sidney J. Walker
ATTORNEY

United States Patent Office 3,513,501
Patented May 26, 1970

3,513,501
FILM WIDTH CONTROLLER
Harold L. Hearns, Midland, Mich., assignor to The Dow Chemical Company, Midland, Mich., a corporation of Delaware
Filed Sept. 7, 1967, Ser. No. 666,106
Int. Cl. B29d 7/02
U.S. Cl. 18—2                                    8 Claims

ABSTRACT OF THE DISCLOSURE

New and useful apparatus is described which enables one to control and measure the width of a plastic film during manufacture. Through connective use of air pressure acting on motors through switching arrangements, racks and gears, the width of a film or web is measured without using a fixed reference and without edge guide control. This device can also be used to position webs and to perform other related functions.

BACKGROUND OF THE INVENTION

Field of the invention

This invention relates to the manufacture and processing of webs such as plastic film, sheet and the like, and, more particularly, to means for continuously measuring the width of the film.

Description of the prior art

In the production of continuous webs, it is well known that in order to maintain a high rate of quality production, it is necessary, among other things, to maintain and control the width of the continuous traveling film. The measuring of the film, sheet or web or positioning same with the use of edge guides has proved to be unsatisfactory. This is so especially where the film is thin and easily crumpled or torn as it contacts the edge guide. Automatic means to measure film or web width using a fixed reference have also been found to have serious shortcomings. Among these, is the difficulty of measuring width during operation because of the lateral sway of the moving film. In order to measure such width or to position the film as it travels and to do it quickly, efficiently and without clogging, it is most desirable to employ controlling means which employ neither a fixed reference nor edge guide control.

SUMMARY OF THE INVENTION

This invention employs pneumatic means to sense or find the film edges and connectively signal the width of the film through switches with motor and rack and gear arrangements which in turn accurately relay the necessary impulses to appropriate measuring and control devices to control the width of the film. As will be pointed out in further detail, the novel arrangement taught by this invention permits accurate and speedy measurement of the traveling film, irrespective of lateral sway and with an adjustable width tolerance.

It is an object of this invention therefore to provide novel width measuring and controlling means during the manufacture of moving films.

A further object of this invention is to provide such novel film control without the use of a fixed reference and without edge guide control.

Another object of the invention is to provide apparatus that can efficiently and quickly measure the width of traveling film irrespective of lateral film sway.

Another object of the invention is to provide novel film edge finders which can be adjusted to a desired degree of tolerance.

BRIEF DESCRIPTION OF THE DRAWINGS

A preferred embodiment of the invention is shown in the accompanying drawings, wherein.

DESCRIPTION OF THE PREFERRED EMBODIMENT

Figure 1:
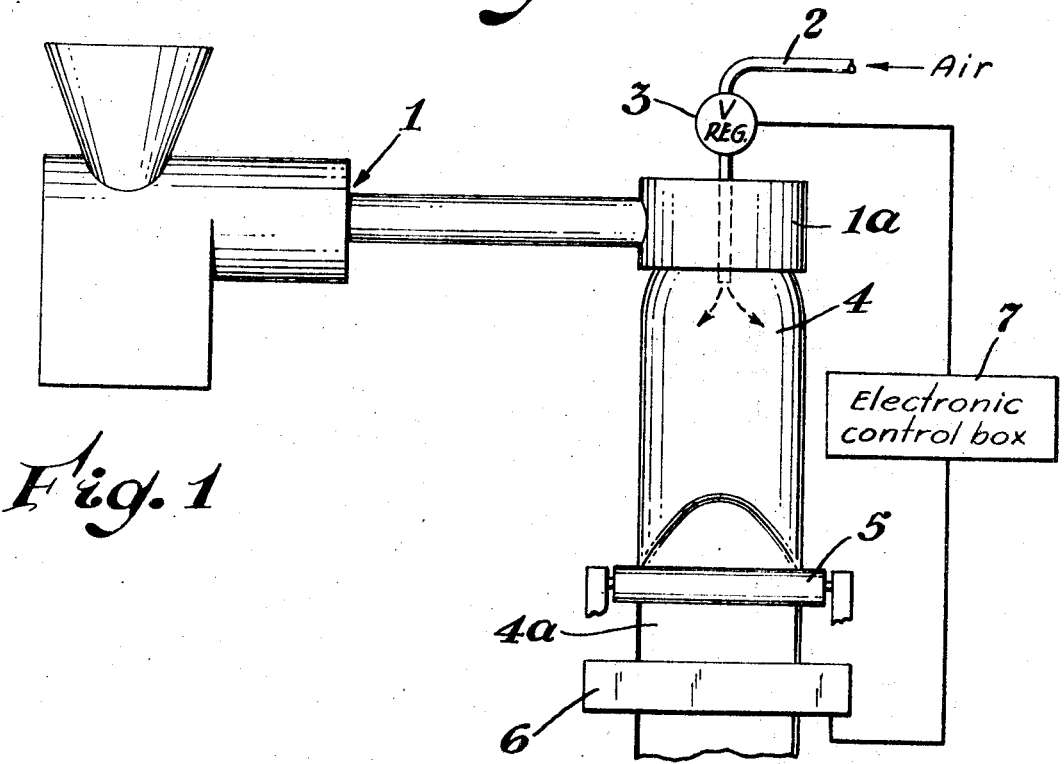
FIG. 1 is a schematic and diagrammatic representation of the "air bubble" process of film extrusion showing the relative position of the width measuring and controlling portion of the invention.

Looking now with more particularity at the drawings, FIG. 1 shows schematically an arrangement for the continuous automatic control of film which is tubularly extruded. A film source or extruder 1 receives the polymeric material, heat plastifies it and extrudes it tubularly through annular die 1a with the aid of air pressure coming from tube 2 through regulated valve 3. The extruded film 4 emerges as a tubular envelope, the width of which is ultimately governed by the amount of air allowed to enter the extruder 1 via valve 3. The tubular envelope 4 is flattened by roller 5 and assumes configuration 4a. At this stage it is ready to be acted upon by the film width controlling apparatus shown in FIG. 1 as 6, electronic control box 7, and regulated valve 3.

Figure 2:
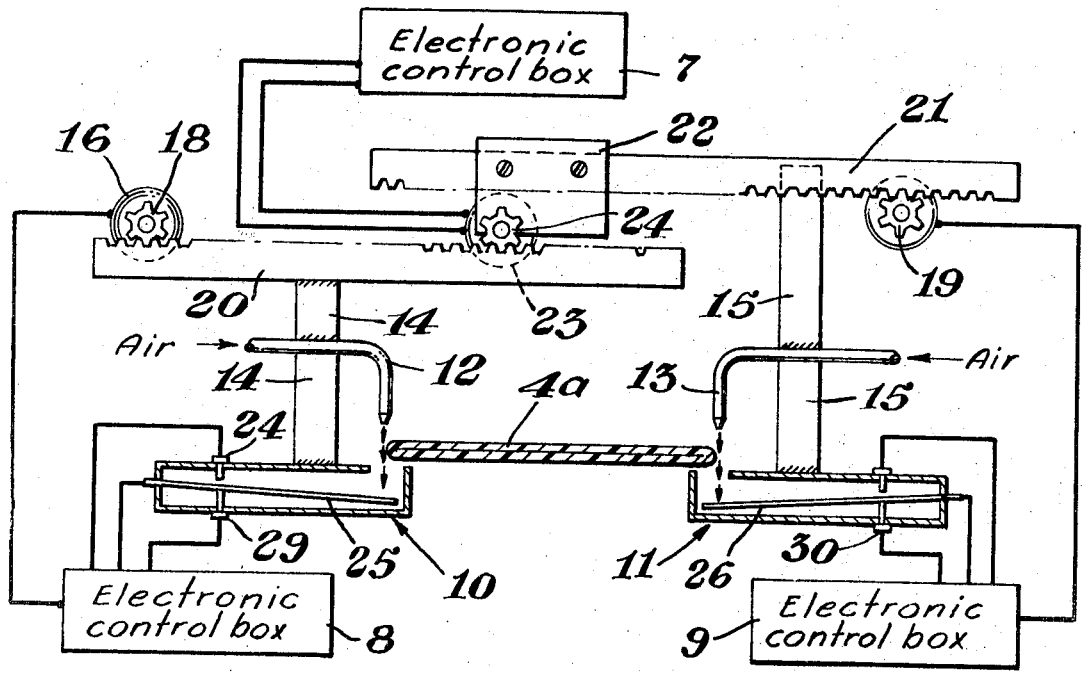
FIG. 2 is a schematic and diagrammatic representation of the width measuring and controlling apparatus.

FIG. 2 shows the apparatus 6 in detail wherein film 4a is shown as a flattened tube passing under movable air jets 12 and 13 which are positioned above the edges of film 4a. Jets 12 and 13 are connected respectively by supports 14 and 15 to rack gears 20 and 21. Positioned beneath jets 12 and 13 and also connected to rack gears 20 and 21 respectively by supports 14 and 15 are reed type switches 10 and 11, respectively, which in turn are wired to electronic control boxes 8 and 9, respectively. These control boxes essentially provide activation and switching for servo motors 16 and 17 which drive gears 18 and 19, respectively, in two directions. Gears 18 and 19 mesh with rack gears 20 and 21 respectively and move said rack gears and attached jets 12 and 13. Rack gear 21 has gear 24 attached by support 22. Gear 24 meshes with and is driven by rack gear 20 to move potentiometer 23. Potentiometer 23 is electrically connected to electronic control box 7 which regulates valve 3 as shown in FIG. 1.

The operation of the apparatus as above described is as follows: Initially, the edge finders which are comprised of pneumatic jets 12 and 13 through which air is supplied (from a source not shown), and switches 10 and 11, are positioned optimally so as to produce the desired film width. Switches 10 and 11 have resilient reed type connectors 25 and 26, respectively, which are responsive to the jets of air coming from jets 12 and 13. Depending on whether or not the respective edge of film 4a is blocking the air jet, totally, partially or not at all, reeds 25 and 26 will either contact upper connectors 27 and 28, respectively, or lower connectors 29 and 30, respectively, or none of them if the jet is partially blocked by the film edge and just enough air is hitting the reed surface to hold the reed between the connectors without making contact (null position). The degree to which the null position is maintained can be adjusted by changing the air jet pressure or the reed resiliency or the distance between jet and reed. This in turn will determine the width tolerance that will be allowed during film manufacture. It is pointed out that the interaction between air jet and reed on the one side is independent of the interaction of air jet and reed on the other side. These actions are dependent on the position of the film edge relative to the path of the air jet in each case so that there are in fact nine probabilities vis-a-vis the relative position of the reeds. For example, the film 4a could widen to the left (as we view the drawing) totally blocking jet 12, causing reed 25 to contact connector 27, while the right edge of 4a remains unchanged laterally in the ideal position of partial blocking, whereby reed 11 would stay centered and contact neither connector 28 or 30. And as can be seen from FIG. 2, and as will be further delineated, each reed actuates its own motor and in turn its own gear, rack gear and its own edge finder of which it is a part.

In the production of a plastic film by the bubble process, the plastic is extruded from 1 into a tubular configuration. This tube 4, while in the plastic state, is then blown with air from tube 2 through valve 3. Valve 3 regulates the amount of air entering the tube. It is controlled in turn by electronic control box 7. The film is cooled and set to give a stable tube and then collapsed by suitable apparatus and nip rolls which are portrayed by roller 5 in FIG. 2 to give collapsed envelope 4a. The width of 4a is measured by electronic control box 7 which is fed the deviation impulses from potentiometer 23. Control box 7 also controls the amount of air going into the plastic tube 4.

Thus, air enters the air jets 12 and 13, and, assuming that neither are blocked by film 4a (film too narrow), depresses switches 10 and 11. This activates the motors 16 and 17 to drive gears 18 and 19 which mesh with rack gears 20 and 21 which move the air jets 12 and 13 until edges of film 4a are contacted. This deflects part of the air and reeds 25 and 26 break contact and remain centered resulting in an equilibrium (null) position. If the film widens beyond the optimal on both sides, the reeds then contact the upper connections, activating the motors to drive in opposite direction which moves the rack gears outwardly until the edges of the film are again contacted by the air from jets 12 and 13. Movement of the rack gears caused by narrowing or widening of the film from its desired width changes the resistance of potentiometer 23. Note that through the attachment of gear 24 to rack gear 21, the potentiometer will move if only one rack gear moves. A resistance change is thus registered if only one edge of film 4a widens or narrows (relative to the center of the film). Also, where the film's lateral position shifts or meanders but no widening or narrowing of the film takes place, this arrangement will not reflect a resistance change and no signal will be transmitted by the potentiometer to electron control box 7. Where there is a resistance change, it is transmitted to control box 7 which receives the signal and through the use of appropriate measuring devices, controls the air pressure to the bubble to control the width of film 4. In this manner, then, the film width is maintained and any deviations are quickly and accurately corrected.

The above description of the invention along with the accompanying drawings are for the purpose of illustrating the preferred embodiment, and it is to be understood that changes may be made in the structural details and application of same without departing from the scope of this invention.

Thus, for example, processes other than the bubble process, for producing continuous lengths of film can successfully employ this invention.

I claim:

1. An apparatus for automatically controlling the width of a moving film comprising in combination, a film source producing a film of tubular configuration, means to collapse said film, a pair of independent edge-seeking means disposed at the opposing lateral edges of the collapsed film transverse to the movement thereof and predeterminedly distanced from one another, each said edge-seeking means capable of actuating, in reversible direction, one of a pair of movable support means, each of said pair of movable support means movably supporting the edge-seeking means actuating it transversely of the film movement, both of said movable support means movements translatable to means for controlling the flow of gas onto said tubular film to correct its size responsive to deviations from the predetermined distance between said edge-seeking means and while in the plastic state.

2. Apparatus as in claim 1 wherein each of the said pair of independent edge-seeking means comprises pneumatic means and switch means, said pneumatic means directed perpendicularly to a plane of the moving film, said switch means juxtaposed directly in a line with said pneumatic means in moving relation thereto, with the said plane of the moving film interposed therebetween, said switch means including a conductive reed responsive to said pneumatic means.

3. An apparatus as claimed in claim 1 wherein each of the said movable support means comprise, in combination, a fixed support for said edge-seeking means, a reversible motor and gear assembly cooperatively acting with a rack gear means, one of said movable support means translating its movement to the said control means through the said rack gear means meshing with gear means connected to the said control means, and the second of said movable support means translating its movement to the said control means by connection to the support of said gear means connected to the said control means.

4. Apparatus for measuring the width of a moving tubular film, comprising in combination, a pair of independent web edge finders, predeterminedly distanced from each other, said finders each attached to one of a pair of rack gear means movably operated by its attached finder, each of said rack gear means communicating any deviation in the predetermined distance between the said web edge finders to means for controlling the flow of gas into said tubular film while in the plastic state.

5. Apparatus as claimed in claim 4, wherein each of said pair of rack gear means comprise a motor reversibly driven by said attached web edge finder, said motor moving a rack gear transversely to the movement of the said web proportionately to the movement of the said attached finder, one of said rack gears directly transmitting its movement to said control means, the second of said rack gears indirectly transmitting its movement to the said control means through the first rack gear.

6. Apparatus as claimed in claim 5 wherein each of said pair of independent web edge finders comprise an air jet and a switch, said air jet directed perpendicularly at a plane of the said moving web, said switch positioned in line with said air jet and adjustably responsive thereto, the said plane of the said moving web interposed between said jet and said switch, said switch including a conductive reed capable of actuating the said rack gear means to which it is attached in one direction, the opposite direction, or not at all, depending on whether the moving web is respectively interposed completely, not at all, or partly, between the said air jet and the said reed.

7. Apparatus for following the edge position of moving material, said apparatus comprising a movable edge-seeking means including pneumatic means and conductive reed switch means, said pneumatic means directing a jet stream to the vicinity of an edge of said material such that said stream is blocked, partially blocked, or permitted free flow past said edge depending on the position of the edge, said reed switch means being movable with said pneumatic means and being disposed such as to intercept a portion of said stream passing said edge, whereby said stream operates said reed switch means, said reed switch means in turn, operating power means capable of moving said edge-seeking means transversely to follow said edge responsive to the degree of blocking of said stream by the edge.

8. Apparatus according to claim 7 including a pair of said edge-seeking means disposed at the opposing lateral edges, respectively, of said material, electrical power means and conductive reed switch means being associated with each edge-seeking means, respectively, such that said edge-seeking means operate independently of each other.

References Cited

UNITED STATES PATENTS

| | | |
|---|---|---|
| 2,289,933 | 7/1942 | Rankin. |
| 2,295,399 | 9/1942 | Hanna. |
| 2,762,077 | 9/1956 | Markowitz. |
| 2,810,316 | 10/1957 | Snyder. |
| 2,931,917 | 4/1960 | Beelitz. |
| 3,341,888 | 9/1967 | Bridge et al. |
| 3,368,007 | 2/1968 | Palmer. |
| 3,396,219 | 8/1968 | Sutterfield et al. |

WILLIAM J. STEPHENSON, Primary Examiner

U.S. Cl. X.R.

18—14